United States Patent
Hwang

(10) Patent No.: US 9,302,622 B2
(45) Date of Patent: Apr. 5, 2016

(54) CONTROL DEVICE FOR CHANGING SCREEN AND AUDIO OF AVN SYSTEM BASED ON MODE OF VEHICLE

(71) Applicant: TINNOS INC., Seoul (KR)

(72) Inventor: Eun Seok Hwang, Suwon-si (KR)

(73) Assignee: TINNOS INC., Seoul (KR)

( * ) Notice: Subject to any disclaimer, the term of this patent is extended or adjusted under 35 U.S.C. 154(b) by 0 days.

(21) Appl. No.: 14/707,687

(22) Filed: May 8, 2015

(65) Prior Publication Data

US 2015/0353012 A1    Dec. 10, 2015

(30) Foreign Application Priority Data

Jun. 10, 2014  (KR) .......... 10-2014-0070371
Apr. 7, 2015   (JP) .............. 2015-078399

(51) Int. Cl.

| | |
|---|---|
| *B60R 11/02* | (2006.01) |
| *G06F 3/14* | (2006.01) |
| *B60R 1/00* | (2006.01) |
| *G06F 3/0481* | (2013.01) |
| *G06F 3/0482* | (2013.01) |
| *G06F 3/0484* | (2013.01) |
| *G06F 3/16* | (2006.01) |
| *H04N 7/18* | (2006.01) |

(52) U.S. Cl.
CPC ............... *B60R 1/00* (2013.01); *G06F 3/0482* (2013.01); *G06F 3/04817* (2013.01); *G06F 3/04847* (2013.01); *G06F 3/165* (2013.01); *B60R 2300/207* (2013.01); *B60R 2300/40* (2013.01); *B60R 2300/70* (2013.01); *B60R 2300/8066* (2013.01); *B60R 2300/8086* (2013.01)

(58) Field of Classification Search
CPC ................ B60R 1/00; B60R 2300/105; B60R 2300/302; B60R 2300/305; G06K 9/00791
See application file for complete search history.

(56) References Cited

U.S. PATENT DOCUMENTS 6,052,646 A *  4/2000  Kirkhart ................ G01C 21/26
                                            342/357.74
6,580,373 B1*  6/2003  Ohashi ..................... B60R 1/00
                                             340/425.5

(Continued)

*Primary Examiner* — Sath V Perungavoor
*Assistant Examiner* — Howard D Brown, Jr.
(74) *Attorney, Agent, or Firm* — Hauptman Ham, LLP

(57) ABSTRACT

A control device for changing screen and audio of an AVN system includes a surrounding-state-information acquisition unit that acquires surrounding state information of a vehicle, an output unit that outputs the surrounding state information acquired by the surrounding-state-information acquisition unit, a gear-shifting-state sensing unit that senses a shifting state of a gear of the vehicle, a booting execution unit that performs an initial booting process for booting the AVN system when a system power is applied with a start of an engine of the vehicle, and a control unit that outputs the surrounding state information acquired by the surrounding-state-information acquisition unit from the output unit with priority over the initial booting screen and audio outputted by the booting execution unit when a reverse gear state is sensed by the gear-shifting-state sensing unit while the initial booting process is being performed by the booting execution unit.

3 Claims, 2 Drawing Sheets

(56) References Cited

U.S. PATENT DOCUMENTS

| | | | |
|---|---|---|---|
| 2003/0128103 A1* | 7/2003 | Fitzpatrick | B60K 35/00 340/425.5 |
| 2006/0164230 A1* | 7/2006 | DeWind | B60K 35/00 340/461 |
| 2008/0136911 A1* | 6/2008 | Shaffer | H04N 7/181 348/148 |
| 2009/0251333 A1* | 10/2009 | Itani | G01C 21/36 340/932.2 |
| 2012/0044351 A1* | 2/2012 | Kook | B60K 35/00 348/148 |
| 2012/0162427 A1* | 6/2012 | Lynam | B60R 1/00 348/148 |
| 2013/0093958 A1* | 4/2013 | Yoshikawa | G01C 21/3661 348/705 |
| 2014/0168428 A1* | 6/2014 | Nefedov | H04N 7/18 348/143 |
| 2015/0151689 A1* | 6/2015 | Kimura | G06F 3/14 348/118 |

* cited by examiner

CONTROL DEVICE FOR CHANGING SCREEN AND AUDIO OF AVN SYSTEM BASED ON MODE OF VEHICLE

CROSS-REFERENCE TO RELATED APPLICATIONS

This application claims the benefit of Korean Patent Application No. 10-2014-0070371 filed with the Korean Intellectual Property Office on Jun. 10, 2014 and Japanese Patent Application No. 2015-078399 filed with the Japanese Patent Office on Apr. 7, 2015, the disclosures of which are incorporated herein by reference.

BACKGROUND

1. Field

The present disclosure relates to a control device for changing screen and audio of an AVN (Audio, Video, Navigation) system of a vehicle based on a mode of the vehicle, and more particularly, to a control device for changing screen and audio of an AVN system of a vehicle based on a mode of the vehicle, in which when setting the vehicle into a reverse gear mode right after the vehicle's engine is started, rear information of the vehicle is immediately outputted without outputting an initial booting screen and sound during a booting process of the AVN system, thus enabling a user to drive the vehicle backward while checking the rear information of the vehicle.

2. Description of the Related Art

In general, AVN system is a multimedia system for a vehicle in which an audio system, a video system and a navigation system are integrated into one unit. The development of such AVN system allows for user to conveniently manipulate various multimedia devices and more effectively utilize the interior space of the vehicle.

Typically, though the AVN system is supplied with power source via a dedicated cable of a vehicle, the power source is supplied from the cigar jack of the vehicle in case of external terminal. The AVN system performs an operation to end the system when a user cut off the power supply by drawing out the power cable from the cigar jack or end operation signal is inputted by the user.

Korean Patent Publication No. 10-2007-0020697 describes such an AVN system.

However, in such a prior art, AVN system performs booting process of the system at the time the power is turned on and initial booting screen is displayed on a display unit in the middle of such a booting process. During the initial screen being displayed, images from a rear camera mounted on the rear of a vehicle are not displayed even if gear of the vehicle is set into reverse mode. Also, there are some cases where it is switched to the initial booting screen immediately when switched to images of a rear camera. Therefore, there is a problem that it is impossible to use the images of the rear camera during outputting the initial screen of booting the AVN system when a driver wishes to back up his vehicle right after engine of the vehicle is started.

Further, there is a problem that the transition and operation of the screen are not consistent and a user cannot use instinctively because each of the conventional AVN systems uses separate system for each manufacturer.

SUMMARY

A control device for changing screen and audio of an AVN (Audio, Video, Navigation) system based on a mode of a vehicle, according to some embodiments of the present disclosure, includes a surrounding-state-information acquisition unit including a camera and a microphone and configure to acquire surrounding state information of a vehicle, an output unit configured to output the surrounding state information acquired by the surrounding-state-information acquisition unit, a gear-shifting-state sensing unit configured to sense a shifting state of a gear of the vehicle, a booting execution unit configured to perform an initial booting process for booting the AVN system when a system power is applied with a start of an engine of the vehicle, and a control unit configured to output the surrounding state information acquired by the surrounding-state-information acquisition unit from the output unit with priority over the initial booting screen and audio outputted by the booting execution unit when a reverse gear state is sensed by the gear-shifting-state sensing unit while the initial booting process is being performed by the booting execution unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
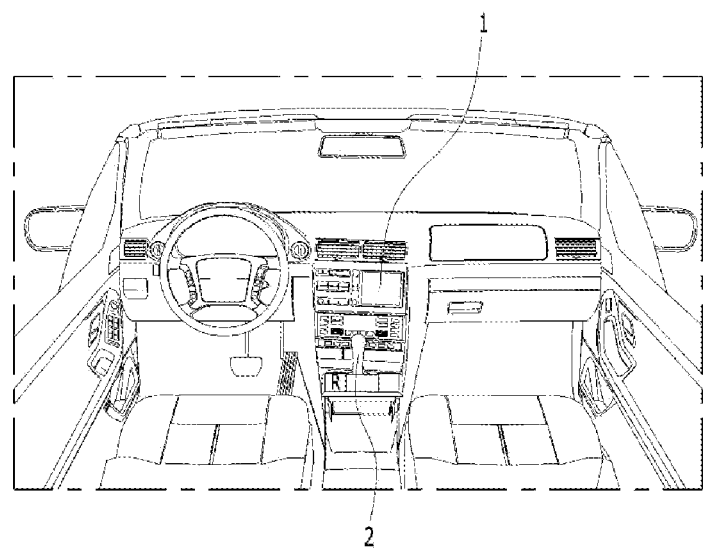
FIG. 1 is a schematic diagram for explaining the operation of AVN system according to some embodiments of the present disclosure.

Exemplary embodiments of the present disclosure are described in detail below with reference to the accompanying drawings. In the following descriptions, like reference numerals designate like elements although the elements are shown in different drawings. Further, detailed descriptions of known functions and configurations incorporated herein are omitted for the purpose of clarity and for brevity.

According to some embodiments of the present disclosure, a screen and audio change control device of an AVN system checks the mode of transmission 2 during booting the AVN system when engine of a vehicle is started. When the mode of the transmission 2 is in reverse mode, a screen and audio change control device 100 of the AVN system displays images taken by a rear camera of the vehicle without displaying the initial booting screen of the AVN system on display device 1.

Here, the screen and audio change control device 100 of the AVN system can also display images taken by a front camera of the vehicle without displaying the initial booting screen of the AVN system on display device 1 even when the mode of the transmission 2 is in drive (D) mode.

In other words, in according to the present disclosure, the screen and audio change control device 100 of the AVN system checks the mode of the transmission 2 and displays the initial booting screen on the display device 1 only when the mode of the transmission 2 is in parking mode or neutral mode while the engine of the vehicle is started, power source is supplied to the AVN system and the initial booting process is performed, whereas when the transmission 2 is in reverse (R) mode or drive (D) mode, the screen and audio change control device 100 outputs the screen corresponding to each of those gear modes in preference to the initial booting screen.

Further, in according to the present disclosure, when a driver selects a media mode different to current media mode of operation, the screen and audio change control device 100 of the AVN system stores the current media mode of operation as hold mode and performs the operation corresponding to the selected media mode.

The operation relating to mode conversion will be described in detail with reference to FIGS. 3 and 4.

Figure 2:
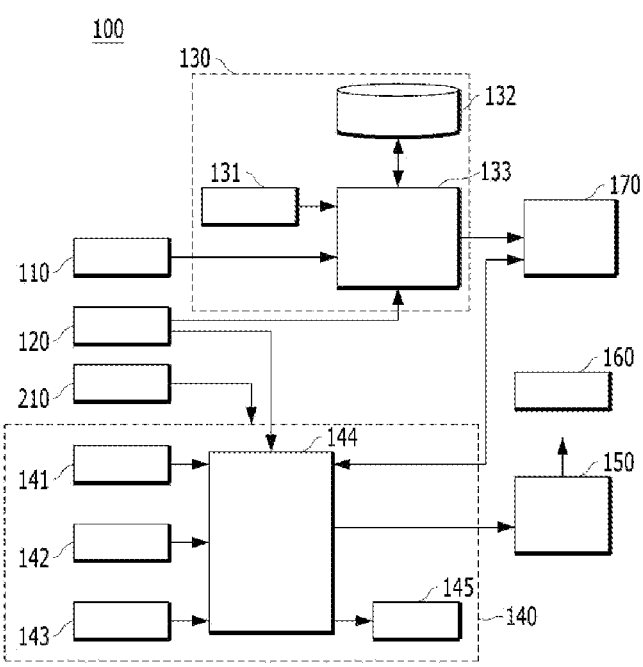
FIG. 2 is a block diagram of a screen and audio change control device of AVN system according to some embodiments of the present disclosure.

FIG. 2 is a block diagram of a screen and audio change control device 100 of AVN system according to some embodiments of the present disclosure.

According to some embodiments of the present disclosure, the screen and audio change control device 100 of the AVN system comprises a vehicle speed sensing unit 110, an input unit 120, a navigation device 130, a screen and audio change unit 140, an audio processing unit 150, a speaker 160 and a display unit 170.

The vehicle speed sensing unit 110 senses the vehicle speed and outputs information on the vehicle speed to the navigation device 130.

The input unit 120 includes a plurality of media buttons for selecting media modes (Media Button), a plurality of toggle buttons for selecting toggle modes (Toggle Button) and a plurality of sustain buttons for selecting sustain modes (Sustain Button).

The media button is a Hard Key that allows for a user to select media modes including iPod mode, DTV mode, DVD mode, Music mode, Photo mode, Radio mode and Video mode. As another form, the input unit 120 can also include a Soft Key for selecting the media modes.

The toggle button is a Hard Key that allows for a user to select toggle modes including INFO mode, HOME mode and CLIMATE mode. As another form, the input unit 120 can also include a Soft Key for selecting the toggle modes.

The sustain button is a Hard Key that allows for a user to select sustain modes including MAP (DEST, ROUTE) mode, Phone mode and SETUP mode. As another form, the input unit 120 can also include a Soft Key for selecting the sustain modes.

A plurality of media buttons for selecting the media modes, a plurality of toggle buttons for selecting the toggle modes and a plurality of sustain buttons for selecting the sustain modes are disposed in order that are frequently used based on a drivers criterion. If the input unit 120 consists of the Soft Key, the screen icons corresponding to a plurality of media modes, a plurality of toggle modes and a plurality of sustain modes are disposed and displayed in the front of screen in order of frequently used mode based on a driver's criterion.

The navigation device 130 comprises a GPS (Global Positioning System) receiver 131, a map data DB 132 and a navigation control unit 133.

The GPS receiver 131 receives GPS satellite signal and outputs the received signal to the navigation control unit 133.

The map data DB 132 stores map (Map) data.

The navigation control unit 133 calculates current position of a vehicle based on the GPS satellite signal. The navigation control unit 133 operates in navigation mode responsive to mode selection signal received from the input unit 120.

The screen and audio change unit 140 comprises a booting execution unit 141, a surrounding-state-information acquisition unit 142, a gear-shifting-state sensing unit 143 and a control unit 144.

The booting execution unit 141 performs initial booting process for booting AVN system when power source is applied to the AVN system by start of vehicle's engine. For example, in the initial booting process, the booting execution unit 141 preferentially boots a program for acquiring and displaying surrounding state information on a vehicle (images taken by rear camera or front camera, sound around the vehicle) prior to other programs. For example, the booting execution unit 141 performs the booting in order of a program for checking the mode of transmission 2, a program for acquiring surrounding the state information on the vehicle by the surrounding-state-information acquisition unit 142, a program for displaying images taken by the front camera of the vehicle, and any other program.

The surrounding-state-information acquisition unit 142 includes a camera and a microphone to acquire the surrounding state information on the vehicle. The surrounding-state-information acquisition unit 142 also acquires surrounding image information on the vehicle via the camera and acquires surrounding sound information on the vehicle via the microphone.

Here, the camera includes a front camera for acquiring front image information on the vehicle which is mounted on the front of the vehicle and a rear camera for acquiring rear image information on the vehicle which is mounted on the rear of the vehicle.

The gear-shifting-state sensing unit 143 senses the gear shifting state shifted by transmission of the vehicle.

The control unit 144 controls to preferentially output the surrounding state information on the vehicle acquired by the surrounding-state-information acquisition unit 142 rather than the initial booting serene and sound outputted by the booting execution unit 141 when the gear-shifting-state sensing unit 143 senses reverse (R) mode as gear information while the booting execution unit 141 performs the initial booting process. Since a program for checking the mode of the transmission 2 and a program for acquiring the surrounding state information on the vehicle by the surrounding-state-information acquisition unit 142 boot earner than other programs in the initial booting, the control unit 144 preferentially outputs the surrounding state information on the vehicle by the surrounding-state-information acquisition unit 142 rather than the initial booting screen and sound outputted by the booting execution unit 141.

Here, the speaker 160 or the display unit 170 constitutes an output unit.

The screen and audio change unit 140 may further include an audio playback unit 145. The audio playback unit 145 may play an audio media or receive a broadcast to play.

The control unit 144, for example, may operate in Music mode responsive to the mode selection signal received from the input unit 120. When operating in Music mode, the control unit 144 outputs mode control signal MCTL1 to the audio playback unit 145.

Also, the control unit 144, for example, may operate in Video mode responsive to the mode selection signal received from the input unit 120. When operating in Video mode, the control unit 144 outputs video data to the display unit 170.

Further, the control unit 144 is responsive to the audio control signal to output Mute release signal to the audio processing unit 150.

The audio processing unit 150 converts broadcasting audio data received from the control unit 144 into broadcast audio signal and outputs the converted broadcast audio signal to the speaker 160. The audio processing unit 150 stops the output of the broadcast audio signal to the speaker 160 when receiving Mute signal from the input unit 120 during outputting the broadcast audio signal to the speaker 160. When the audio processing unit 150 receives Mute release signal from the input unit 120, the audio processing unit 150 resumes the output of the broadcast audio signal to the speaker 160.

Further, the audio processing unit 150 reduces the volume of the broadcast audio signal to be outputted to the speaker 160 when receiving volume down signal from the input unit 120, and raises the volume of the broadcast audio signal to be outputted to the speaker 160 to the previous level when receiving volume recovery signal.

The audio processing unit 150 converts playback audio data received from the control unit 144 into playback audio signal to output the converted signal to the speaker 160. Further, the audio processing unit 150 converts audio guide data received from the navigation control unit 133 into audio guide signal to output the converted audio guide signal to the speaker 160.

The display unit 170 displays Map screen based on the video date received from the navigation control unit 133. In addition, the display unit 170 displays a screen associated with Radio mode operation of an audio device based on video date received from the control unit 144 in Radio mode. Further, the display unit 170 displays a playback video screen based on playback video date received from the control unit 144 in Video mode.

In some embodiments of the present disclosure, depending on the forms of implementing the invention, the control unit 144 plays the video or audio corresponding to first media mode when first media mode selection signal is inputted from the input unit 120, plays the video corresponding to first toggle mode when first toggle mode selection signal is inputted from the input unit 120, and plays the video or audio corresponding to first sustain mode when first sustain mode selection signal is inputted from the input unit 120.

Further, when reverse parking mode signal is inputted from a parking assist device 210, the control unit 144 reduces the audio volume of current mode, plays image signal inputted from the parking assist device 210 and raises the audio volume of reverse parking mode larger than the audio volume of current mode.

As an example, the parking assist device 210 receives information on gear position from the gear-shifting-state sensing unit 143 and operates an ultrasonic sensor mounted on the front or the rear of a vehicle depending on the gear position. For example, when the gear position is in reverse state, the parking assist device 210 operates the rear camera and the ultrasonic sensor mounted on the rear of a vehicle to provide image signal taken by the rear camera and signal from the ultrasonic sensor to the screen and audio change unit 140.

In reverse parking mode, the control unit 144 controls the audio processing unit 150 to reduce the volume of audio signal for its previous mode and raise the volume of warning signal.

Figure 3:
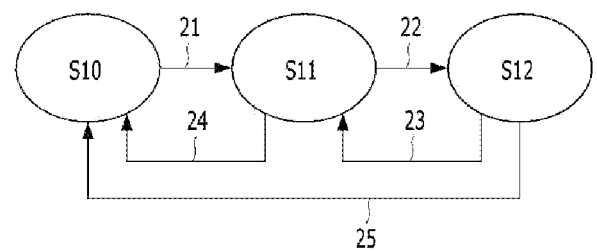
FIG. 3 is a schematic diagram for explaining the operation of a screen and audio change control device of AVN system according to some embodiments of the present disclosure.

Referring to FIG. 3, when second toggle mode (for example, CLIMATE mode) selection signal is inputted from the input unit 120 in a state where current mode S10 is in first media mode (for example, DVD mode), the control unit 144 stores the first media mode as hold mode, switches the audio signal of the first media mode to Mute state S11 (Step 21), and then transfers to a state S12 where plays the video corresponding to the second toggle mode (Step 22). Further, when any one of toggle mode selection signals for a plurality of toggle modes is inputted from the input unit 120, the control unit 144 checks the hold mode and plays the video corresponding to the first media mode checked as the hold mode (Step 23).

In other words, according to some embodiments of the present disclosure, the screen and audio change control device 100 of the AVN system checks hold mode and performs previous mode which is stored as the hold mode if a user just presses any one of a plurality of toggle buttons without the need to remember the previous mode. As an example, if the user does not want to perform the previous mode, for example, the screen and audio change control device 100 of the AVN system may be constructed to perform a desired media mode or toggle mode after pressing a reset button. Here, the reset button may be a sustain button.

When performing Step 23 in FIG. 3, the control unit 144 checks whether ON signal of the audio volume is inputted since the previous mode is in Mute state of the audio signal. And if the ON signal of the audio volume is inputted (Step 24), the control unit 144 turns on the audio volume. Also, in FIG. 3, the control unit 144 plays the video or audio corresponding to the first media mode (Step 25) when the first media mode selection signal is inputted from the input unit 120 in the second toggle mode state.

Further, when second sustain mode (for example, Photo mode) selection signal is inputted from the input unit 120 in a state where current mode (S10 state) is in the first media mode (for example, DVD mode), the control unit 144 stores the first media mode as hold mode, switches the audio signal of the first media mode to Mute state (Step 21), and then plays the video or audio corresponding to the second sustain mode (Step 22). In addition, when toggle mode selection signal for selecting any one of a plurality of toggle modes is inputted from the input unit 120, the control unit 144 checks the hold mode which is stored and plays the video corresponding to the first media mode checked as the hold mode (Step 23).

When performing Step 23, the control unit 144 checks whether ON signal of the audio volume is inputted since the previous mode S11 is in Mute state of the audio signal. And if the ON signal of the audio volume is inputted (Step 24), the control unit 144 turns on the audio volume.

If a state in Step S12 is in the second sustain mode, the control unit 144 plays the video or audio corresponding to the first media mode (Step 25) when the first media mode selection signal is inputted from the input unit 120 in the second sustain mode state S12.

Figure 4:
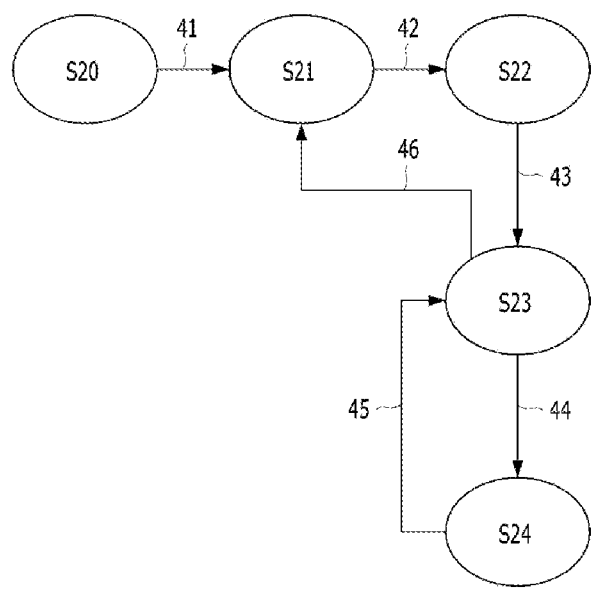
FIG. 4 is a schematic diagram for explaining the operation of a screen and audio change control device of AVN system according to some embodiments of the present disclosure.

Referring to FIG. 4, when second media mode selection signal is inputted from the input unit 120 in a state where current mode (S20 state) is in the first media mode, the control unit 144 stores the first media mode as first hold mode, switches the audio signal of the first media mode to Mute state S21 (Step 41), and then plays the video or audio corresponding to the second media mode (Step 42). Further, when third toggle mode selection signal is inputted from the input unit 120, the control unit 144 stores the second media mode as second hold mode, switches the audio signal of the second media mode to Mute state (S23 state) (Step 43), and then plays the video corresponding to the third toggle mode (Step 44).

When a toggle mode selection signal for selecting any one of a plurality of toggle modes is inputted from the input unit 120, the control unit 144 checks the first and second hold modes which are stored, determines whether or not to play the video corresponding to the second media mode which is checked as the second hold mode and then, if positive, plays the video corresponding to the second media mode (Step 45). Whereas, if negative, the control unit 144 determines whether or not to play the video corresponding to the first media mode which is checked as the first hold mode. If the result of the determination is positive, the control unit 144 plays the video corresponding to the first media mode (Step 46).

Further, when a third sustain mode selection signal is inputted from the input unit 120, the control unit 144 stores the second media mode as the second hold mode, switches the audio signal of the second media mode to Mute state (S23 state) (Step 43), and then plays the video corresponding to the third sustain mode (Step 44).

When a toggle mode selection signal for selecting any one of a plurality of toggle modes is inputted from the input unit 120, the control unit 144 checks the first and second hold modes which are stored, determines whether or not to play the video corresponding to the second media mode which is checked as the second hold mode and then, if positive, plays the video corresponding to the second media mode (Step 45). Whereas, if negative, the control unit 144 determines whether or not to play the video corresponding to the first media mode which is checked as the first hold mode. If the result of the determination is positive, the control unit 144 plays the video corresponding to the first media mode (Step 46).

One of the technical objects of the present disclosure is to provide an AVN system that preferentially outputs images of a rear camera without outputting initial booting screen in the middle of booting the AVN system when gear of a vehicle is set into reverse mode right after the vehicle's engine is started.

Another of the technical objects of the present disclosure is to provide a control device for changing the screen and audio of an AVN system that can define criteria on the screen and audio change of the VAN system and allow for a user to easily recognize and instinctively understand.

Yet another of the technical objects of the present disclosure is to provide a control device for changing the screen and audio of an AVN system that enables a user-friendly environment by occurring the transition of screen at the time of switching between media modes, providing only a media (audio) without displaying a media mode screen in non-media mode, and displaying the screen only by selection of a user who wishes to see it.

Yet another of the technical objects of the present disclosure is to provide a control device for changing the screen and audio of an AVN system that does not occur the transition of screen even if a user selects any one of media mode and non-media mode when current mode is in reverse parking mode.

Yet another of the technical objects of the present disclosure is to provide a control device for changing the screen and audio of an AVN system that allows user's operability to be improved by arranging screen icons of modes according to the user's frequency of use such that the screen icons corresponding to relatively frequently used modes based on a driver's criterion (for example, Radio mode, USB mode, DTV mode, DVD mode, Music mode, Photo Mode and Video mode) are disposed to the front, whereas the screen icons corresponding to relatively occasionally used modes based on a driver's criterion (for example, Buetooth™ mode, iPod™ mode and digital TV mode) are disposed in the back.

The present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

What is claimed is:

1. A control device for changing screen and audio of an AVN (Audio, Video, Navigation) system based on a mode of a vehicle, the control device comprising:
    a surrounding-state-information acquisition unit including a camera and a microphone, and configure to acquire surrounding state information of a vehicle;
    an output unit configured to output the surrounding state information acquired by the surrounding-state-information acquisition unit;
    a gear-shifting-state sensing unit configured to sense a shifting state of a gear of the vehicle;
    a booting execution unit configured to perform an initial booting process for booting the AVN system when a system power is applied with a start of an engine of the vehicle;
    a control unit configured
        to output the surrounding state information acquired by the surrounding-state-information acquisition unit from the output unit with priority over the initial booting screen and audio outputted by the booting execution unit when a reverse gear state is sensed by the gear-shifting-state sensing unit while the initial booting process is being performed by the booting execution unit, and
        to output a video signal from the surrounding-state-information acquisition unit, reduce a first audio volume corresponding to a first audio signal, and increase a second audio volume corresponding to a second audio signal outputted in a mode corresponding to the reverse gear state to a level higher than the first audio volume, when the reverse gear state is sensed by the gear-shifting-state sensing unit while outputting the first audio signal; and
    an input unit configured to receive an input to select the mode of the vehicle from
        a media mode for playing a video or an audio,
        a toggle mode for switching the mode between two different modes with pressing a first button, in which a video or an audio different from the video or the audio of the media mode is playable, and
        a sustain mode for irreversibly switching the mode with pressing a second button, in which a video or an audio different from the videos or the audios of the media mode and the toggle mode is playable,
    wherein,
        when the first button is pressed while the video or the audio of the media mode is being played, the control unit is configured
            to store the media mode as a hold mode,
            to mute the video or the audio being of the media mode being played, and
            to play the video or the audio of the toggle mode,
        when the first button is pressed again while the video or the audio of the toggle mode is being played, the control unit is configured to play the video or the audio of the media mode stored as the hold mode, and
        when the second button is pressed while the video or the audio of the media mode or the toggle mode, the control unit is configured to play the video or the audio of the sustain mode.

2. The control device according to claim 1, wherein the media mode includes at least iPod mode, DTV mode, DVD mode, Music mode, Photo mode, Radio mode, Video mode, Bluetooth™ Music mode, Digital TV mode, Aux Audio mode, and Aux video mode,
the toggle mode includes at least INFO mode, HOME mode, and CLIMATE mode, and
the sustain mode includes at least MAP (DEST, ROUTE) mode, Phone mode, and Setup mode.

3. The control device according to claim 1, wherein icons for the media mode, the toggle mode, and the sustain mode are arranged and displayed on a foreground of the screen in order of a frequency of use.

\* \* \* \* \*